(12) United States Patent
Becker et al.

(10) Patent No.: US 6,425,557 B1
(45) Date of Patent: Jul. 30, 2002

(54) HEIGHT-ADJUSTABLE UNDERFRAME OF A VEHICLE SEAT WITH TWO SIDE PARTS

(75) Inventors: Burkhard Becker, Solingen; Robert Houston, Leichlingen; Michael Moog, Solingen, all of (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 09/903,000

(22) Filed: Jul. 11, 2001

(30) Foreign Application Priority Data

Aug. 30, 2000 (DE) .......................... 100 42 851

(51) Int. Cl.[7] .............................................. F16M 11/00
(52) U.S. Cl. .................................. 248/157; 297/344.15
(58) Field of Search ................................ 248/157, 419, 248/420, 421, 422, 424; 297/344.15

(56) References Cited

U.S. PATENT DOCUMENTS

| 4,767,157 A | * | 8/1988 | Kazaoka et al. ............ 297/322 |
| 4,805,481 A | | 2/1989 | Bauer et al. |
| 5,697,674 A | * | 12/1997 | Aufrre et al. .......... 297/344.15 |
| 5,735,500 A | * | 4/1998 | Borlinghaus et al. ....... 248/419 |
| 5,967,471 A | * | 10/1999 | Borlinghaus et al. ....... 248/157 |
| 6,015,131 A | * | 1/2000 | Brewer, III .................. 248/638 |
| 6,264,275 B1 | * | 7/2001 | Frohnhaus et al. ..... 297/344.12 |
| 6,276,650 B1 | * | 8/2001 | Kojima et al. .............. 248/429 |
| 6,290,198 B1 | * | 9/2001 | Kojima et al. .............. 248/422 |

FOREIGN PATENT DOCUMENTS

| DE | 3608858 | 10/1987 |
| DE | 4400910 | 7/1995 |

* cited by examiner

Primary Examiner—Anita King
Assistant Examiner—Kofi A. Schulterbrandt
(74) Attorney, Agent, or Firm—Akerman Senterfitt

(57) ABSTRACT

The height-adjustable underframe of a vehicle seat has a left and a right couple of rails of a longitudinal adjusting device and a left and a right side part that are each hinge-connected to the corresponding seat rail of the couple of rails by way of a rear and a front pivoting arm on the left and the right side of the vehicle seat. A blocking arm is linked by a lower end region to the corresponding seat rail on the hinge point of a rear pivoting arm. The blocking arm is detachably fixed in proximity to its upper end in a stopping device, which is fastened on the corresponding side part.

13 Claims, 1 Drawing Sheet

HEIGHT-ADJUSTABLE UNDERFRAME OF A VEHICLE SEAT WITH TWO SIDE PARTS

Figure 1:
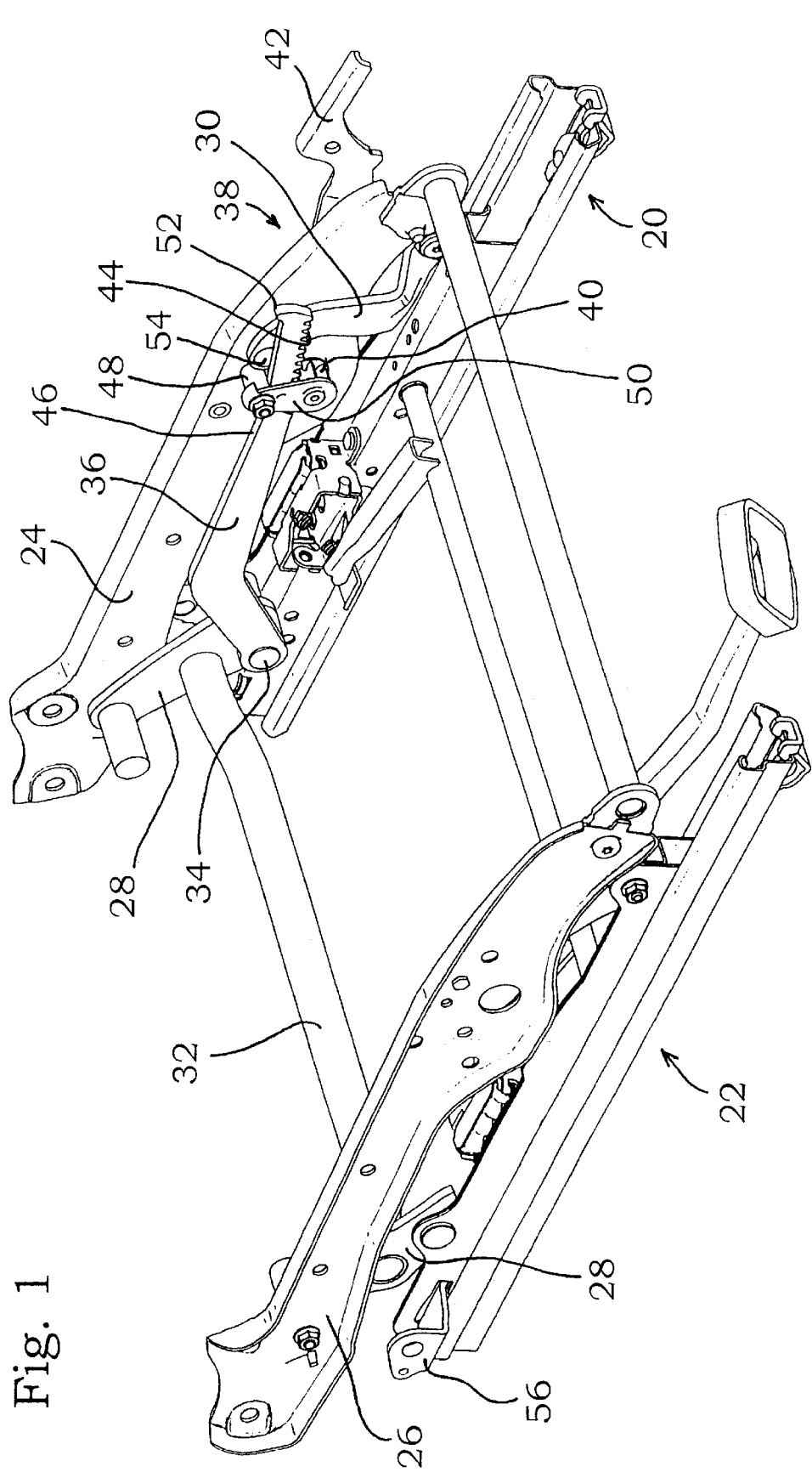

The invention relates to a height-adjustable underframe of a vehicle seat with a left and a right couple of rails of a longitudinal adjusting device and with a left and a right side part that are each hinge-connected to the corresponding seat rail of the couple of rails by way of a rear and a front pivoting arm.

Height-adjustable underframes of this type have been known in many kinds of embodiments. Each seat side constitutes a four-bar linkage. Said four-bar linkage is adjusted and locked by designing one joint in such a way that it may be adjusted and locked, for instance by means of a sector gear that is concentric with the joint and of a pinion that is in engagement with said sector gear. Adjustment and locking may be carried out by way of a drive, mostly an electric motor, or by hand. One is anxious to arrange the adjusting and locking device on the side part. As a result thereof, it always remains in the same position relative to a passenger when it is hand-controlled.

One is also anxious not to position the adjusting and locking device too far backward, more specifically not in the region underneath a seat back of the vehicle seat, but rather to the front, toward the front edge of the seat. It is thus more conveniently within reach for a passenger.

The invention proceeds from these considerations. It is its object to develop the underframe of a vehicle seat of the type mentioned herein above in such a way that the stopping device, which provides for the adjustment and the locking functions, may be arranged quite far to the front, in any case preferably in front of the longitudinal center of the side parts. This makes it possible to save space in the rear region of the seat, underneath the seat back. The actuators for the stopping device may be arranged so as to be conveniently within reach.

In view of the height-adjustable underframe of the type mentioned herein above, the solution to this object is to provide a blocking arm that is linked by a lower end region to the corresponding seat rail on the hinge point of a rear pivoting arm and that is detachably fixed in proximity to its upper end in a stopping device, which is fastened on the corresponding side part.

The blocking arm is almost oriented on a diagonal in the four-bar linkage which is formed by the seat rail, the rear pivoting arm, the side carrier and the front pivoting arm. As a result thereof, the four-bar linkage is considerably stiffer in stopped condition than when only one of the four joints is being blocked. The stopping device may be arranged on differential locations of the side part, a handy position for hand-control may be achieved thereby, an optimum position may also be found for a motor-driven adjustment. One is thereby freed from the actual hinge point, so that space for components can be saved or used otherwise.

In a preferred embodiment, the blocking arm is provided with teeth in the region of its upper, front end and the stopping device has a pinion that is rotatably carried in bearings in the corresponding side part. A stopping device that is easy to operate and reliably locking is thus achieved with simple means.

In an alternatives embodiment front end of the blocking arm can be realized as a stopping device comprising a spindle, and a rotatable nut, which receives said spindle, is fixed on the side part.

In a particularly preferred embodiment, the stopping device is arranged in proximity to the hinge point of the front pivoting arm on the corresponding side part. As a result, a relatively great length of support is provided by the blocking arm. It is furthermore now possible to arrange the front and rear pivoting arms of the seat side in one plane and to accommodate the blocking arm in a plane offset relative thereto. Accordingly, the blocking arm is a plane part. It is oriented parallel to the corresponding side part.

In another, preferred embodiment, the blocking arm has a guiding area that faces its teeth. There is provided a guide element which is fastened on the corresponding side part opposite the pinion. In this way, the blocking arm is guided between pinion and guide element. The result thereof is a functional realization that is suitable for practical utilization. Said realization is advantageously further developed in that the upper end of the blocking arm is encircled in the form of a ring in the region of the stopping device.

Further advantages and characteristics of the invention will become apparent in the remaining claims and in the following description of an exemplary embodiment of the invention that is not limiting the scope of the invention and that is explained in more detail with reference to the drawing.

FIG. 1: shows a perspective view of a height-adjustable underframe of a vehicle seat with a blocking arm and a stopping device on one seat side.

The height-adjustable underframe according to the unique Figure has a left couple of rails 20 and a right couple of rails 22, both together constituting a longitudinal adjusting device. Furthermore, the underframe has a left side part 24 and a right side part 26. The couples of rails each comprise, as generally known, a bottom rail that is being fastened on an underbody of a vehicle (not shown), and a seat rail. The seat rail is hinge-connected to the corresponding side part 24 or 26 respectively, via a rear pivoting arm 28 in the rear region of the underframe and via a front pivoting arm 30 in the front region thereof. A four-bar linkage is thus being constituted.

In an amended embodiment, the front pivoting arm 30 may be composed of two individual arms that are provided each with an adjusting device of their own. The height of the front edge of the underframe can thus be adjusted separately.

The two rear pivoting arms 28 are non-rotatably connected together by way of a tie bar 32. The two front pivoting arms 30 do not have a direct connection in a manner analogous to that for the tie bar 32. Although such a connection can be provided for, it is not necessary in principle.

The left side of the underframe, which appears on the right side of the Figure, has a device for adjusting the height of the side part 24 relative to the couple of rails 20. This device will be discussed more thoroughly herein after.

A blocking arm 36 is linked to a hinge point 34 that is defined by the hinge axis between the left rear pivoting arm 28 and the corresponding seat rail. This hinge-connection occurs on a lower, rear end region of said blocking arm 36. The blocking arm is substantially oriented on a diagonal of the four-bar linkage constituted by the two pivoting arms 28, 30, the seat rail and the left side part 24.

In proximity to an upper end region of the blocking arm 36, there is provided a stopping device 38 on the corresponding side part 24. In the factual illustration of the exemplary embodiment, the stopping device includes pinion 40 that is rotatably carried in the left side part 24 about an axis of the pinion. It projects from the inner side of said side part, which is facing the other side part 26. The stopping device also includes, an adjusting and locking device, which is hand-controlled in the exemplary embodiment shown and is located on the outer side of said side part 24. Actuation occurs by way of a hand lever 42. So-called step-by-step systems as they have been previously described in DE 36 08 858 A, DE 44 00 910 A and DE 36 16 290 are utilized here.

In the illustration shown, the hand lever 42 is in the position of rest. If it is pulled upward within the admissible pivoting angle, the pinion 40 rotates in one direction. If the hand lever 42 is pressed downward, it rotates the pinion 40 in the other direction of rotation.

Teeth 44 also form part of the stopping device, and are provided on the upper end region of the blocking arm that points toward the front, said teeth permanently meshing the teeth of the pinion 40. On the small face opposite said teeth 44, the blocking arm 36 has a guiding area 46 which is parallel to the teeth 44. A guide element 48 in the form of a stud bolt is assigned to said guiding area. The guiding area 46 slides on said guide element 48. It is possible to design guide element 48 to be elastic so that it resiliently pretensions the guiding area 46, and accordingly the blocking arm 36, relative to the pinion 40.

The bearing axis of the pinion 40 and the guide element 48 designed as a bolt are connected together by a closing part 50. Since the guide element 48 and the pinion 40 are accommodated on the left side part 24, the front, upper end region of the blocking arm 36 is fully annularly enclosed. On its free end, the blocking arm 36 has a lug 52 that projects from the guiding area upward. In an alternative, a lug may also be provided, which projects from the teeth 44 downward. The lug 52 is such designed that the free end region of the blocking arm 36 does not fit through the gap between guide element 48 and pinion 40. The blocking arm 36 is thus prevented from being removed from engagement with the pinion 40.

As shown in the Figure, the left front pivoting arm 30 is linked to the inner side of the left side part 24, this hinge-connection occurs about a hinging axis 54. It is located in immediate proximity to the guide element 48 and slightly above the pinion 40. The front pivoting arm 30 is realized as a flat part which, although it has undergone plastic deformation in its lower region, has not been deformed in the region in which it covers the side part 26. The free end of the blocking arm 36 overlaps and covers the upper region of the front pivoting arm 30 on the inner side of the underframe. As a result, the upper, front end region of the blocking arm 36 is positioned laterally between the front pivoting arm 30 and the closing part 50.

The blocking arm 36 is made in one piece. In the exemplary embodiment shown, it has two angled portions that are inclined to each other with an angle from 120 to 160 degree. As a result thereof, in the position shown, a front portion, which includes the teeth 44, is oriented substantially parallel to the side part 26. A rear portion is positioned at an angle of approximately 45 degree to the couple of rails 20.

The blocking arm 36 is an even stamping part. The distance by which it is spaced from the side part 24 in its front region on account of the interposed front pivoting arm 30 equals the spacing in its rear region, because the rear pivoting arm 28 is arranged in such a manner that it is adjacent the side part 24 by its one main area and that it is facing the blocking arm 36 by its other main area.

In principle, it is also possible not to link the blocking arm on the hinge point 34, but on the rear pivoting arm 28, about the tie bar 32 for example, or to separately link it to the seat rail of the couple of rails 20, e.g., slightly in front of said hinge point 34.

In the embodiment shown, the pinion 40 is located underneath the teeth 44. An inverted arrangement is also possible in which the teeth 44 are realized on the small face of the blocking arm 36 that points upward. Then, the thereto allocated guiding area points downward.

In a preferred embodiment, blocking arm 36 and the thereto assigned stopping device 38 are located on the seat side on which the buckle for the belt is not fastened. As can be surveyed from the Figure, the right seat side has a bracket 56 for fastening a belt buckle by way of a transition piece. As is generally known, the belt buckle is located on the tunnel side of a vehicle. Accordingly, the adjusting and locking device according to the invention for height-adjustment is situated on the outer side of the seat, that is, on the side facing the door.

An electric motor driven embodiment may be realized according to DE 195 23 136 A, particularly FIG. 2 there. A spindle drive is also possible as it been disclosed by DE 199 56 614 A. For this purpose, the front, upper of the blocking arm 36 is to be designed as a spindle.

It is possible to provide an adjusting and locking device according to the invention on both seat sides. For this purpose, one blocking arm 36 that engages a pinion is provided on either seat side. The two pinions are rotatably connected. A stopping device is assigned to but one pinion.

What is claimed is:

1. A height-adjustable underframe of a vehicle seat having a left and a right seat side, the underframe comprising in combination:
   a left and a right couple of rails of a longitudinal adjusting device, each
   couple of rails comprising a seat rail,
   a left rear and a left front pivoting arm,
   a right rear and a right front pivoting arm,
   a left and a right side part that are each hinge-connected to the corresponding seat rail of the couple of rails by way of the
   corresponding rear and the corresponding front pivoting arm,
   a stopping device, and
   a blocking arm having a lower end region and an upper end, which
   blocking arm is linked by the lower end region to one of the seat rails on a hinge point of the corresponding rear pivoting arm and which blocking arm is detachably fixed in proximity to its upper end in the stopping device which is fastened on the corresponding side part.

2. The height-adjustable underframe according to claim 1, wherein the blocking arm is provided with teeth in the region of its upper end and wherein the stopping device has a pinion that is rotatably carried in bearings in the corresponding side part.

3. The height-adjustable underframe according to claim 2, wherein one of a hand-controllable actuating drive and an electric motor driven drive is assigned to the pinion.

4. The height-adjustable underframe according to claim 1, wherein the stopping device is arranged in proximity to the hinge point of the front pivoting arm on the corresponding side part.

5. The height-adjustable underframe according to claim 2, wherein the blocking arm has a guiding area that faces its teeth and wherein there is provided a guide element which is fastened on the corresponding side part opposite the pinion and is neighboring said guiding area.

6. The height-adjustable underframe according to claim 1, wherein the upper end of the blocking arm is encircled in the form of a ring in the region of the stopping device.

7. The height-adjustable underframe according to claim 1, wherein the blocking arm is made in one piece out of two angled portions.

8. The height-adjustable underframe according to claim 2, wherein the teeth are pointing toward the couple of rails of the longitudinal adjusting device on the seat rail of which the blocking arm is linked.

9. The height-adjustable underframe according to claim 1, wherein the two rear pivoting arms are non-rotatably connected to each other by way of a tie-bar and wherein a blocking arm and a corresponding stopping device are provided on one seat side only.

10. The height-adjustable underframe according to claim 1, wherein the blocking arm is located in the immediate neighborhood of a front pivoting arm.

11. The height-adjustable underframe according to claim 1, wherein the blocking arm is located in the immediate neighborhood of a front pivoting arm and slides on said front pivoting arm.

12. The height-adjustable underframe according to claim 1, wherein the blocking arm is made in one piece out of two angled portions that are inclined to each other with an angle from 120 to 160 degree.

13. The height-adjustable underframe according to claim 1, a blocking arm and a corresponding stopping device is each provided on the left and on the right seat side.

* * * * *